No. 728,942. PATENTED MAY 26, 1903.
H. LEITNER & R. N. LUCAS.
ELECTRICAL CUT-OUT AND REGULATOR.
APPLICATION FILED DEC. 22, 1902.
NO MODEL. 3 SHEETS—SHEET 2.

Witnesses.
C. J. Redfern
A. Slhhott

Inventors.
Henry Leitner
Richard Norman Lucas

No. 728,942. Patented May 26, 1903.

UNITED STATES PATENT OFFICE.

HENRY LEITNER, OF WOKING, AND RICHARD NORMAN LUCAS, OF BYFLEET, ENGLAND.

ELECTRICAL CUT-OUT AND REGULATOR.

SPECIFICATION forming part of Letters Patent No. 728,942, dated May 26, 1903.

Application filed December 22, 1902. Serial No. 136,268. (No model.)

*To all whom it may concern:*

Be it known that we, HENRY LEITNER, residing at Maybury, Woking, and RICHARD NORMAN LUCAS, residing at Rose Villa, Byfleet, county of Surrey, England, both subjects of the King of Great Britain, have invented new and useful Improvements in Electrical Cut-Outs and Regulators, of which the following is a specification.

Our invention relates to an improved cut-out and regulator especially applicable for use in connection with electrical train-lighting systems wherein a dynamo is arranged in conjunction with a battery of accumulators, the chief object of the said invention being to provide means whereby when from any cause, such as the slackening of the speed of the train, the voltage of the current generated by the dynamo falls below that of the accumulators, so that a reversal of the direction of the current in the dynamo takes place, the connections between the dynamo and the accumulators shall be broken and so remain until the required speed of rotation of the dynamo is again attained. Furthermore, as the device is completely balanced it can be satisfactorily employed on railway-trains and in other cases where it is subjected to considerable vibrations.

According to our invention we make use of a field-magnet the polarity of the pole-pieces of which is capable of reversal, according as to whether it is energized by the dynamo-current or the accumulator-current, and of an armature in the field of the said magnet adapted to move under the change of polarity of the pole-pieces and to operate a commutator or contact device for breaking the charging-circuit for the accumulators, or we can provide for reversing the polarity of the armature, leaving that of the field-magnet constant.

Figure 1:
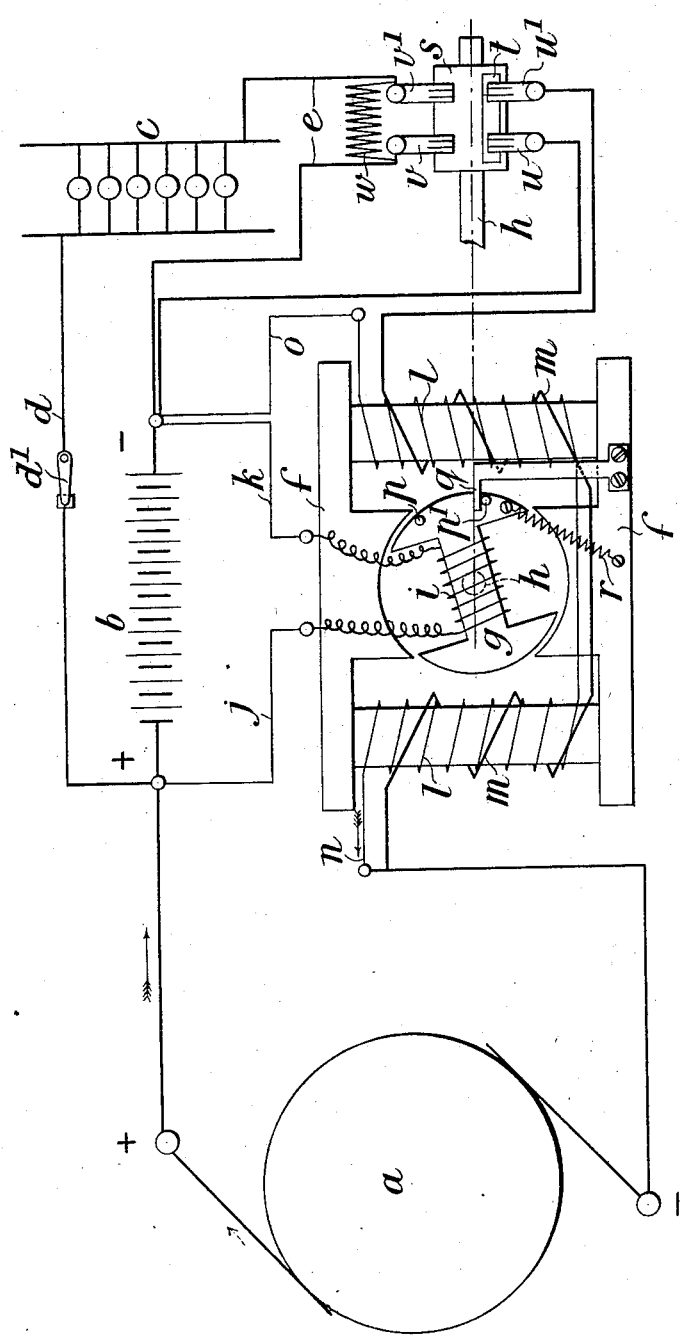
Figure 2:
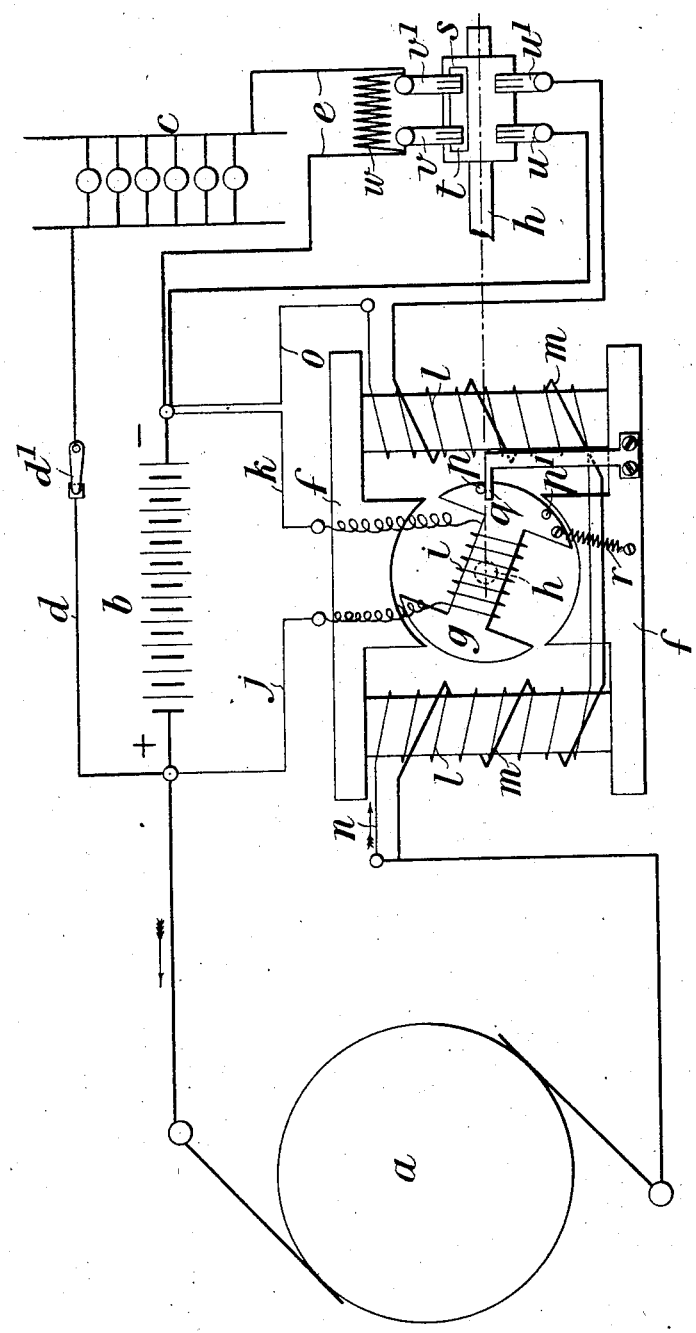
Figure 3:
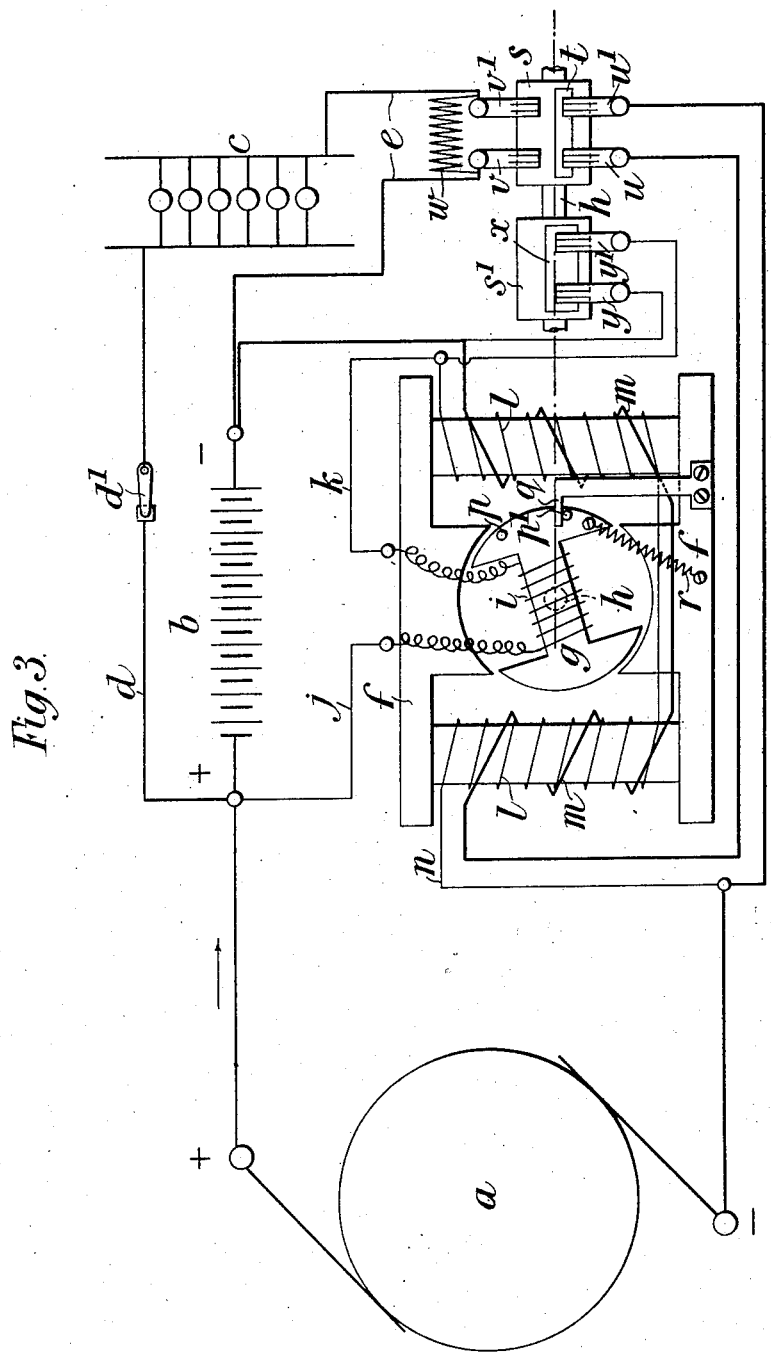

In the accompanying drawings, to which we refer in order that the nature of our invention may be better understood, and which we hereby make part of this specification, Figure 1 is a diagrammatic view illustrating a system of electrical train-lighting provided with our improved cut-out and regulator, the parts being in the normal position—that is to say, in the position they assume when the dynamo is charging the accumulators—and Fig. 2 is a similar view, but showing the parts in the position wherein the electrical connections between the dynamo and accumulators are broken. Fig. 3 is a similar view of a slightly-modified arrangement of the device.

$a$ represents the dynamo, $b$ the battery of accumulators, and $c$ the lamps, which are shown in parallel and connected to the positive and negative poles of the battery by the wires $d$ and $e$, respectively.

$d'$ is a hand-switch for the lamp-circuit.

$f$ is the field-magnet of the cut-out, and $g$ is the armature thereof, the latter being here shown of H section and being mounted between the poles of the magnet $f$ upon the spindle $h$. This armature is provided with a fine-wire winding $i$, connected to the positive and negative poles of the accumulators by the wires $j$ and $k$, respectively. The field-magnet $f$ has two windings—viz., a fine-wire winding $l$ and a coarse-wire winding $m$—the latter of which carries the main dynamo-current and is in the circuit containing the dynamo and accumulators. The former or fine-wire winding $l$ is connected to the negative pole of the dynamo and to the negative pole of the accumulators by the wires $n$ and $o$, respectively.

$p$ and $p'$ are stops for controlling the movement of the armature in either direction, the said stops engaging the fixed stop $q$, and $r$ is a spring which normally tends to bring the armature into the position shown in Fig. 2.

$s$ is the commutator-switch or contact device for breaking the charging-circuit for the accumulators, as hereinafter described. The said commutator is mounted upon the spindle $h$, so that it moves with the armature $g$, and is furnished with a metal strip $t$, which can be brought into the position shown in Fig. 1, in which position it makes electrical contact between two brushes or collectors $u\ u'$ in the main charging-circuit, or into the position shown in Fig. 2, where it makes contact between two brushes $v\ v'$ in the lamp-circuit.

When the dynamo is running up to its minimum charging speed—that is to say, when the parts of the cut-outs are in the position shown in Fig. 1—the current from the dynamo $a$ flows through the external circuit-brush $u$, strip $t$, brush $u'$, and coarse winding $m$. It also flows through the fine winding $l$ by the wires $o$ and $n$ in the direction of the arrows, and the resulting polarity of the field-magnet $f$ maintains the armature $g$ (and consequently the commutator $s$) in the position shown in this figure. When, however, the speed of the dynamo falls to such an extent that its voltage drops below that of the battery $b$, current first ceases to flow through the windings and then current from the battery flows through both windings of the field-magnet in a reverse direction to that in which the current from the dynamo $a$ previously flowed. The polarity of the pole-pieces of the field-magnet $f$ is consequently reversed and the armature $g$ is turned into the position shown in Fig. 2, owing to the action of the spring $r$ and to the reversal of polarity. This partial rotation of the armature brings the commutator into the position given in Fig. 2, so that the charging-circuit is broken at the brushes $u$ $u'$. It will be obvious that when the train is at rest the parts are in the position shown in Fig. 2 and that they remain so until the train has started and has attained a speed at which the voltage of the dynamo exceeds that of the battery, whereupon current from the dynamo $a$ flows through the winding $l$, slightly charging the accumulators, and this causes the polarity of the field-magnet $f$ to be reversed. This reversal of polarity moves the armature $g$ into the position shown in Fig. 1, thereby causing the strip $t$ to bridge the brushes $u$ and $u'$ and allowing current to flow to the battery through the winding $m$, strengthening the magnetism of the field-magnet $f$, the action being then as above described.

As the voltage of the battery $b$ is increased during charging, we may arrange a resistance $w$ in the lamp-circuit $d$ $e$, this resistance being adapted to be short-circuited by the strip $t$ and brushes $v$ $v'$ when the main or charging circuit is broken, as above described.

In Figs. 1 and 2 both the winding $i$ of the armature of the "cut-out," and the fine-wire winding $l$ of its field are shown connected permanently to the battery $b$, and current consequently to a small extent flows permanently through them. In Fig. 3 an arrangement is illustrated in which when the dynamo $a$ is at rest or has not attained such speed as to excite itself the said windings are disconnected from the battery. To this end we provide a second commutator or switch $s'$ upon the shaft $h$, the said commutator having the contact-strip $x$ and the brushes $y$ $y'$, the latter of which are in electrical connection, respectively, with the negative pole of the battery $b$ and with the excitation-coil $i$ of the armature $g$. The brush $u$ is in this case in electrical connection with one end of the coarse winding $m$ of the field-magnet $f$ and the brush $u'$ with the negative pole of the dynamo $a$, as clearly shown. The strip $x$ is broader than the strip $t$, which bridges the contact-brushes $u$ and $u'$, and is so arranged as to bridge the brushes $y$ $y'$ when the shaft $h$ turns before the brushes $u$ $u'$ are bridged by the contact-strip $t$ and to maintain them bridged after the latter brushes have been connected by the strip $t$. The operation of this arrangement is as follows: When the dynamo $a$ is at rest and until it excites itself, the armature $g$ of the cut-out and the shaft $h$ are in the position shown in Fig. 2, so that the contact-pieces $x$ and $t$ are in such a position that neither the brushes $y$ $y'$ nor the brushes $u$ $u'$ are connected, and the winding $i$ of the cut-out armature is, as will be seen, in series with the fine-wire winding $l$ of its field. When the dynamo $a$ excites, both the windings $i$ and $l$ receive current through $j, k$, and $n$, and the armature moves into an intermediate position between that shown in Fig. 2 and that shown in Fig. 3, stretching the spring $r$ and by the movement of the shaft $h$ causing the contact-piece $x$ to bridge the contact-brushes $y$ $y'$. The tension of the spring $r$ is preferably so adjusted that this movement does not take place until the voltage at the terminals of the dynamo $a$ is distinctly greater than that at the terminals of the battery $b$. When this movement of the armature $g$ has taken place and the contact-brushes $y$ $y'$ been bridged, the current from the dynamo $a$ branches and passes through the armature-winding $i$ and the battery $b$ and brushes $y$ $y'$ in parallel with one another, part flowing through the fine-wire field-winding $l$ back to the negative terminal of the dynamo and the battery $b$ being accordingly charged slightly through the fine-wire field-winding $l$. As the speed of the dynamo and its voltage increase, the current through both to the battery $b$ and the winding $l$ increases. The torque on the armature $g$ also increases and it and its shaft $h$ are accordingly turned into the position shown in Fig. 3, bridging the brushes $u$ $u'$ and, owing to the width of the contact-piece $x$, keeping the brushes $y$ $y'$ also bridged. The current from the dynamo $a$ then flows through the battery $b$ and in addition around the coarse-wire winding $m$ of the field of the cut-out back to the negative terminal of the dynamo through the brushes $u$ $u'$. The current passing through the winding $m$ strengthens the field of the cut-out, causing it to act like a holding-down relay. When the voltage of the dynamo sinks to that of the battery or below it, the current in the field of the cut-out sinks to zero or reverses, and its armature returns to the position shown in Fig. 2, disconnecting the brush $u$ from $u'$ and the brush $y$ from the brush $y'$. The resistance $w$ for the lamp-circuit is shown in the same position as in Figs. 1 and 2, the contact-piece $t$, which bridges the brushes $u$ $u'$, serving to short-circuit it when the dynamo is cut out.

The armature in Fig. 3 is shown connected in such a way that it is in parallel with the battery $b$ when the gap between the brushes $y$ $y'$ is closed; but we may equally well arrange the fine-wire field-winding of the cut-out in that position in the circuit and connect the armature-winding $i$ in the manner in which the fine-wire field-winding $l$ is shown connected in Fig. 3. Also we may arrange the fine and coarse wire windings $l$ and $m$ similarly connected in the circuit on the armature of the cut-out and the fine-wire winding $i$ on the field-magnet of the cut-out.

One of the great advantages of the arrangement hereinbefore described is that all the parts are perfectly balanced and in this respect differ from ordinary cut-outs used in electric lighting. Furthermore our device not merely serves to cut out or cut in at a predetermined voltage, but at any voltage, its action depending entirely upon the fact as to whether the dynamo-voltage is lower or higher than that of the accumulator, so that under no circumstances can the apparatus cut in too early or cut out too late.

The arrangement hereinbefore described can be varied by substituting a permanent magnet for the H-armature with the fine-wire winding or for the field-magnet. Furthermore, as above mentioned, instead of providing for reversing the polarity of the field-magnet we can arrange that the polarity of the armature be reversed, the result in both cases being the same.

Having now particularly described and ascertained the nature of our said invention and in what manner the same is to be performed, we declare that what we claim is—

1. The combination with a dynamo, and a battery adapted to be charged thereby, of a magnetic cut-out, comprising a field-magnet and an armature, one of said parts having a double winding, a main circuit through the dynamo-battery and one of said windings, and a branch circuit through the dynamo, battery and other of said windings, a switch in the main dynamo-circuit and a connection between said switch and the armature, the connections being such that when the voltage of the dynamo falls below that of the battery, the battery-current will pass in reverse direction to the dynamo-current through both windings of the cut-out, and cause the switch to break the main dynamo-circuit, substantially as described.

2. The combination with a dynamo and a battery adapted to be charged thereby, of a magnetic cut-out comprising a field-magnet and an oscillating armature, one of said parts having a coarse and a fine winding, a main circuit through the dynamo and battery and one of said windings, a branch circuit through the dynamo, battery and the other winding, a switch in the main dynamo-circuit operatively connected with the shaft of said oscillating armature, substantially as described.

3. The combination with a dynamo, a battery and a circuit connecting the same, of an automatic cut-out in said circuit comprising a field-magnet provided with coarse and fine windings, and an oscillating armature, a main circuit through the coarse winding, the dynamo, and the battery and a branch circuit through the fine winding, the dynamo and the battery, fixed contacts in said main circuit and a movable contact operatively connected with the said armature for cutting out the dynamo-circuit when it falls below the voltage of the battery-current, and for placing the dynamo in circuit when its voltage exceeds that of the battery, substantially as described.

4. The combination with a dynamo, a battery, and a circuit connecting them, of an automatic cut-out in said circuit comprising a field-magnet, and oscillating armature, one of said parts having a double winding, a main circuit through said dynamo, battery and one winding, a branch circuit through the dynamo, battery and the other winding, stops on said armature, a fixed stop engaging said armature-stops to limit its movement, stationary contacts and an oscillating commutator operatively connected with the shaft of said armature, engaging said contacts, substantially as described.

5. The combination with a dynamo, a battery, and a circuit connecting them, of an automatic cut-out in said circuit comprising a field-magnet and oscillating armature, one of said parts having a double winding, a main circuit through said dynamo, battery and one winding, a branch circuit through the dynamo, battery and the other winding, stops on said armature, a fixed stop engaging said armature-stops to limit its movement, stationary contacts, an oscillating commutator operatively connected with the shaft of said armature and a spring connected with said armature, for assisting its movement in one direction, substantially as described.

6. The combination with a dynamo and a battery to be charged thereby, of an automatic cut-out in said circuit, comprising a field-magnet and armature, one of said parts being provided with double windings, connected with the dynamo, and an oscillating armature, a switch operatively connected with the armature for connecting the fine winding with the battery when the current from the dynamo energizes said armature, and cutting it out when the current from the dynamo falls below the battery-current, and a second switch operatively connected with said armature for connecting the dynamo with the battery and disconnecting it therefrom, substantially as described.

7. The combination with a dynamo and a battery to be charged thereby, of an automatic cut-out, comprising a field-magnet and armature, one of said parts being provided with double windings, a main circuit through the dynamo, battery and one of said windings, a branch circuit through the dynamo, battery and the other winding, a switch in the main circuit, a switch in the branch circuit and connections between said armature and said switches for breaking the main circuit and the branch circuit when the current of the dynamo falls below that of the battery, substantially as described.

8. The combination with a dynamo and a battery to be charged thereby, of an automatic cut-out, comprising a field-magnet and armature, one of said parts being provided with double windings, a main circuit through the dynamo, battery and one of said windings, a branch circuit through the dynamo, battery and the other winding, a switch in the main circuit, a switch in the branch circuit and connections between the said armature and said switches for operating the same, said connections being such that the switch in the main circuit will be opened before the switch in the branch circuit, when the armature is moved in one direction, and the switch in the branch circuit will be closed before the switch in the main circuit when the armature is moved in the other direction, substantially as described.

9. The combination with a dynamo and a battery to be charged thereby, of an automatic cut-out comprising a field-magnet and an oscillating armature, one of said parts being provided with double windings, a main circuit through the dynamo, battery and one of said windings, a branch circuit through the dynamo, battery and the other winding, a pair of separated contacts in said main dynamo-circuit, a pair of separated contacts in the branch circuit, separate contact devices on the armature-shaft for closing and opening the circuit through said pairs of contacts, one of said devices having a portion in advance of the other, substantially as described.

10. The combination with a dynamo, and a battery adapted to be charged thereby, of a magnetic cut-out, comprising a field-magnet and an armature, one of said parts having a double winding, a main circuit through the dynamo, battery and one of said windings, and a branch circuit through the dynamo, battery and the other of said windings, a switch in the main dynamo-circuit and a connection between said switch and the armature, the connections being such that when the voltage of the dynamo falls below that of the battery, the battery-current will pass in reverse direction to the dynamo-current through both windings of the cut-out, and cause the switch to break the main dynamo-circuit, a resistance device in said main circuit and a switch for cutting out said resistance device simultaneously with the breaking of the main dynamo-circuit, substantially as described.

HENRY LEITNER.
RICHARD NORMAN LUCAS.

Witnesses:
C. G. REDFERN,
A. ALBUTT.